United States Patent [19]

Cowlam et al.

[11] Patent Number: 4,576,765

[45] Date of Patent: Mar. 18, 1986

[54] SPHERE/LIQUID SEPARATOR AND SEPARATION METHOD

[75] Inventors: Stephen K. Cowlam; Steven Y. Moss, both of Wantage; Claude L. Stockwell, Newbury; Victor R. Phillips, Woburn Sands, all of England

[73] Assignee: United Kingdom Atomic Energy Authority, London, England

[21] Appl. No.: 656,337

[22] Filed: Oct. 1, 1984

[30] Foreign Application Priority Data

Oct. 5, 1983 [GB] United Kingdom ............... 8326575

[51] Int. Cl.⁴ .............................................. B01D 29/46
[52] U.S. Cl. ................... 210/801; 210/335; 209/314; 15/3.11
[58] Field of Search ............ 209/314, 661, 662; 210/335, 801; 15/3.11

[56] References Cited

U.S. PATENT DOCUMENTS

| | | | |
|---|---|---|---|
| 2,127,270 | 8/1938 | Schaaf | 209/400 |
| 2,158,169 | 5/1939 | Wright | 210/335 |
| 2,329,333 | 9/1943 | Carter | 209/314 |
| 2,703,649 | 3/1955 | Cheyette | 209/314 |
| 3,399,414 | 9/1968 | McLauchlan | 15/3.11 |
| 3,454,162 | 7/1969 | Cover | 209/314 |

FOREIGN PATENT DOCUMENTS 1175834 12/1969 United Kingdom .
1213071 11/1970 United Kingdom .

Primary Examiner—Tim Miles
Attorney, Agent, or Firm—William R. Hinds

[57] ABSTRACT

An apparatus and a method are provided for separating liquid from small spheres, for example spheres formed by gel precipitation. The apparatus comprises sloping screening decks (12, 14), arranged in stepped relationship so that spheres tumble down onto the lower screening deck (14) after passing along the upper screening deck (12), each screening deck comprising a large number of upright plates (30, 60) spaced apart from each other and extending in the direction of slope, so that the liquid drains down between the plates. Alternate plates might be replaced by rods when separating extremely small spheres from a liquid.

The apparatus has no moving parts, and even after inflow of the liquid stops, the spheres still continue to pass through the apparatus.

14 Claims, 3 Drawing Figures

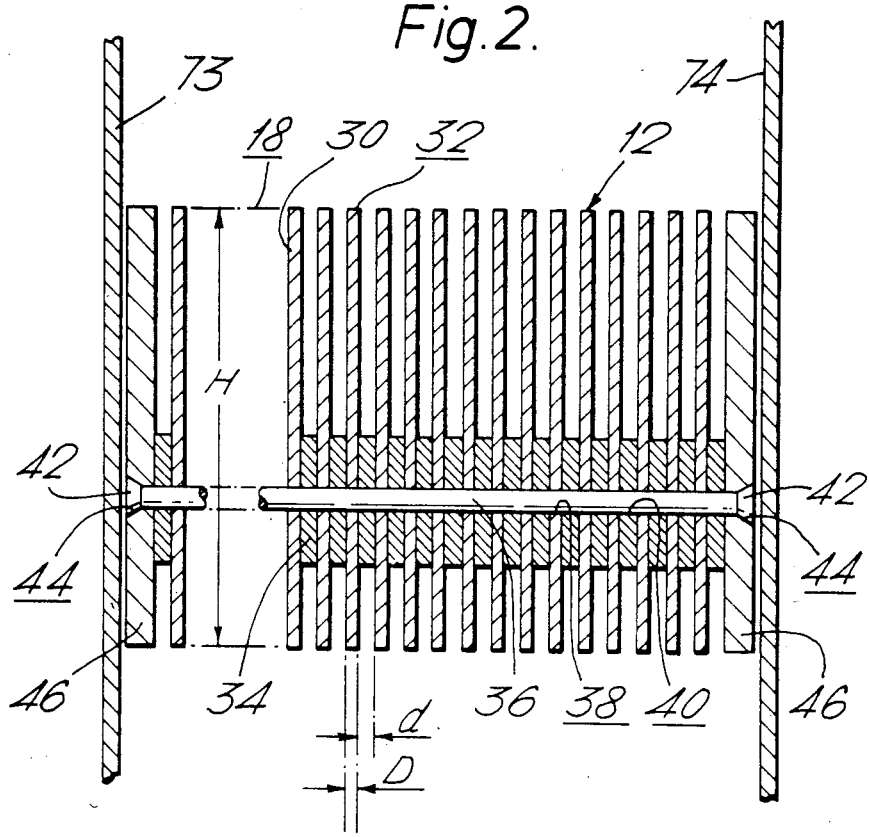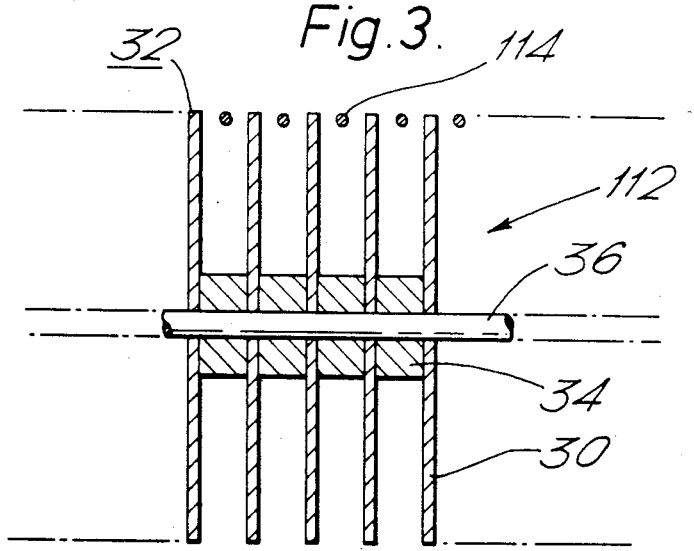

SPHERE/LIQUID SEPARATOR AND SEPARATION METHOD

This invention relates to a method and an apparatus for separating a liquid from particles and more particularly, but not exclusively, for separating liquid from particles of substantially uniform size and substantially spherical shape.

It is known to dewater solid particles by flowing a liquid entraining the particles along one side of a flat or curved screening deck composed of spaced bars running normal to the direction of flow, one such apparatus being described in British patent specification No. 1213071. In plants treating radioactive materials, for example making spheres by a gel precipitation process, it is desirable to be able to remove all the spheres from the plant for nuclear accounting purposes. British Pat. Nos. 1175834, 1231385, 1253807, 1313750 and 1363532 may be referred to for information about gel precipitation processes. In the above described apparatus, however, the bars are aligned such that some of the spheres might remain on the screening deck when flow of the liquid has stopped.

The present invention, therefore, provides a separator for separating liquid from particles of substantially spherical shape, the separator comprising a plurality of stationary sloping screening decks in stepped relationship, each screening deck comprising a plurality of members in spaced relationship to each other and extending in the direction of slope of the respective deck, the width of the space between adjacent members being less than the diameter of the particles, so that in operation of the separator the particles move down the slope of each screening deck and tumble over the step from one screening deck to the next, while the liquid flows downwardly in the spaces between the members.

The members may be laminae, and each lamina may be thinner than the diameter of the particles, or the members may be laminae and rods arranged in an alternating manner.

The invention also provides a method for separating liquid from particles of substantially spherical shape comprising, draining the liquid from the particles by causing the particles to pass along a slotted sloping screening deck, the slots extending in the direction of the slope, breaking up any clumps of the particles by tumbling the particles over a step, and again draining the liquid from the particles by causing the particles to pass along another slotted sloping screening deck.

Preferably the screening decks are inclined at an angle of between 30° and 60° to the horizontal, and the height of the step from one screening deck to the next is desirably at least 30 mm, and preferably about 150 mm.

Since the separator has a plurality of screening decks in stepped relationship, the separation of liquid from the particles takes place in a plurality of stages, the steps breaking the continuous path which would otherwise enable liquid to flow over and around the particles. At the first screening deck the separation is by drainage of liquid from the particles, while the subsequent steps bring about the break-up of any clumps of particles held together by the surface tension of the liquid, so releasing interstitial liquid to drain through the second screening deck. The separator is therefore relatively efficient at separating the liquid from the particles, without involving any moving parts.

The invention will now be further described by way of example only and with reference to the accompanying drawings, in which:

FIG. 2 is a view, to an enlarged scale, on line II—II of FIG. 1 showing a screening deck, and FIG. 3 is a view showing a modification to the screening deck of FIG. 2.

In the drawings, like parts have the same numerals.

Figure 1:
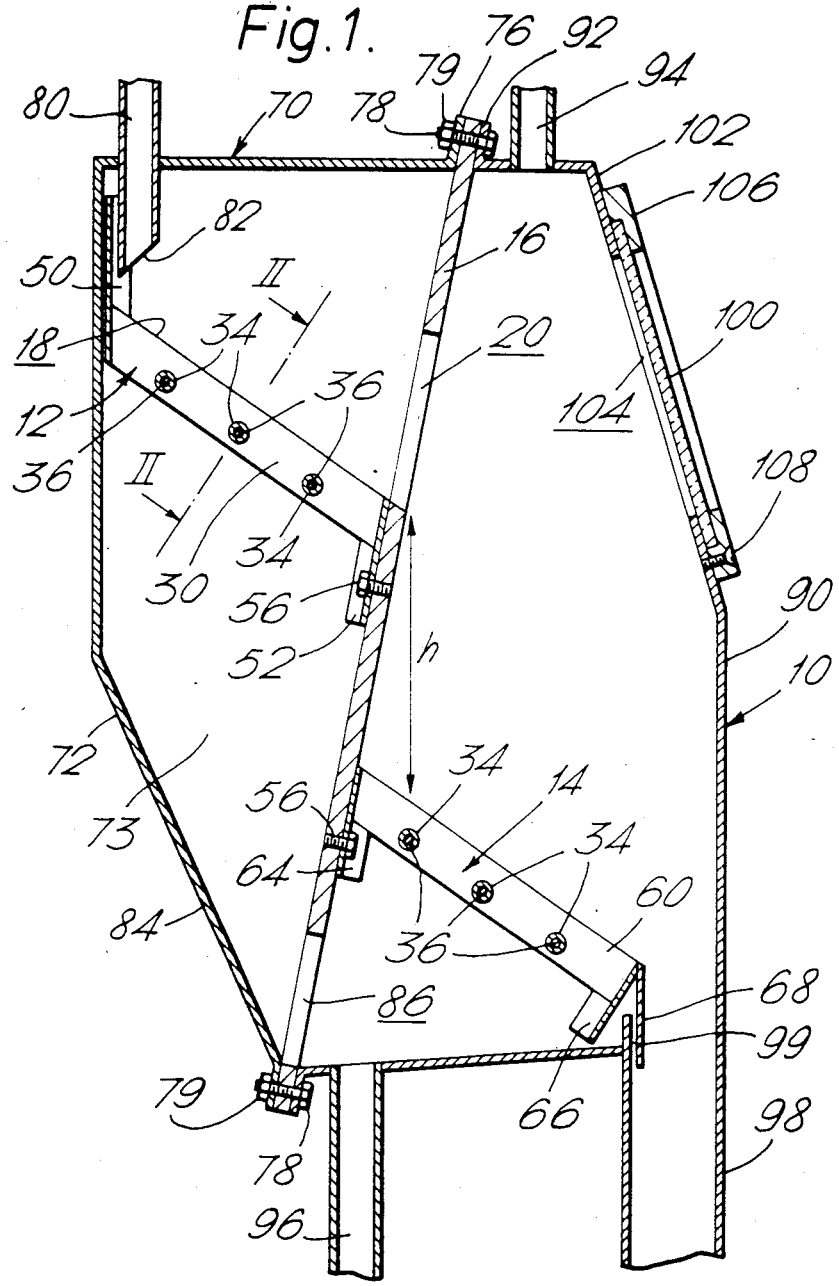
FIG. 1 shows a medial sectional view in the vertical plane through a separator.

Referring to FIG. 1, a separator 10 comprises an upper screening deck 12 and a lower screening deck 14 extending in parallel staggered relationship to each other from opposite sides of a support plate 16, each screening deck 12 and 14 being inclined at an angle of about 40° to the horizontal, and the support plate 16 being inclined at an angle of about 10° to the vertical.

The upper screening deck 12 has an upper surface 18 that aligns with the lower edge of a rectangular hole 20 through the support plate 16 of the same width as the upper screening deck 12, the hole 20 thus overhanging the lower screening deck 14 because of the inclination of the support plate 16.

Referring also to FIG. 2, the upper screening deck 12 comprises a large number of stainless steel plates 30 each of width ½ mm arranged in parallel planes, the upper surface 18 of the screening deck 12 being defined by the upper edges 32 of the plates 30. The plates 30 are held at a spacing of 1 mm by washers 34, the plates 30 and the washers 34 being held together by three tie rods 36 (only one is shown in FIG. 2) extending through aligned holes 38 in the plates 30 and holes 40 in the washers 34. Each end 42 of each of the tie rods 36 is riveted into a countersunk depression 44 in a respective side plate 46, so as to be flush with the outer surface of the side plate 46.

At each end of the upper screening deck 12 both side plates 46 are attached by countersunk screws (not shown) to a respective separator plate 50 or 52 of rectangular channel section and in which the ends of the plates 30 locate. At the upper end of the upper screening deck 12 the respective separator plate 50 extends vertically upwards, while at the lower end the separator plate 52 extends downwards adjacent to the support plate 16 and is attached thereto by screws 56 (only one is shown).

The lower screening deck 14 is similar in construction to the upper screening deck 12, and consists of the same number of stainless steel ½ mm thick plates 60, held together at 1 mm spacing by washers 34 and tie rods 36 extending between side plates (not shown). At each end of the lower screening deck 14 both side plates are attached to a respective separator plate 64 or 66 of rectangular channel section in which the ends of the plates 60 locate. At the upper end of the lower screening deck 14 the respective separator plate 64 extends downwards adjacent to the support plate 16 and is attached thereto by screws 56 (only one is shown). At the lower end of the lower screening deck 14, the separator plate 66 extends downwards perpendicular to the direction of slope of the screening deck 14, and a flat end plate 68 extends vertically downwards from the top edge of the separator plate 66 to overhang a square-section duct 98.

All the above mentioned components of the separator 10 are enclosed within a stainless steel casing 70, generally rectangular in shape and consisting of two portions 72 and 90. The first casing portion 72 encloses the upper screening deck 12, the clearance between side walls 73 and 74 (see FIG. 2) of the casing portion 72 and the side plates 46 of the screening deck 12 being less than 1 mm. A pipe 80 extends vertically through the top of the casing portion 72 with an angled open end 82 a short distance above the upper surface 18 of the upper screening deck 12 adjacent to the separator plate 50, and a sloping lower portion 84 of the first casing portion 72 directs liquid passing through the upper screening deck 12 to a hole 86 through the support plate 16.

The second casing portion 90 encloses the lower screening deck 14, and has a flange 92 whereby it is attached to a corresponding flange 76 of the first casing portion 72 by bolts 78 and nuts 79 (only two are shown in FIG. 1), the edge of the support plate 16 being sandwiched between the flanges 92 and 76. A tubular gas duct 94 extends from the top of the second casing portion 90. A pipe 96 extends downwards from the bottom of the second casing portion 90 near to the support plate 16, and the square section duct 98 extends downwards from the bottom of the second casing portion 90 below the lower end of the lower screening deck 14, part of a wall 99 of the duct 98 extending upwards between the separator plate 66 and the end plate 68. The second casing portion 90 has an inclined upper part 102 with an aperture 104 covered by a glass plate 100 held in position by a frame 106, the frame 106 being attached to the second casing portion 90 by countersunk screws 108 (only one is shown in FIG. 1), so enabling operation of the separator 10 to be observed.

In operation of the separator 10 to separate liquid from a slurry of liquid and gel microspheres of diameter about 2 mm, the slurry is fed through the pipe 80 onto the upper screening deck 12. Much of the liquid drains down between the plates 30 of the upper screening deck 12 to flow down the lower portion 84 of the first casing portion 72, through the hole 86 and out of the pipe 96. The gel microspheres being wider than the spaces between the plates 30 will slide or roll down the sloping upper surface 18 of the upper screening deck 12, taking with them a quantity of interstitial liquid. It will be appreciated that there are no ridges to obstruct the movement of the microspheres.

On reaching the lower end of the upper screening deck 12 the microspheres pass through the hole 20 to fall over the overhanging edge onto the lower screening deck 14. The impact causes any clumps of microspheres to be broken up, so releasing interstitial liquid to drain down between the plates 60 and to flow out of the pipe 96, and the separator plate 66 preventing any liquid from between the plates 60 falling into the duct 98. The microspheres slide or roll down the lower screening deck 14 and are guided into the duct 98 by the end plate 68. Any gases entering the casing 70 with the slurry from the pipe 80 can vent through the gas duct 94.

It has been found that the separator 10 can remove more than half the interstitial liquid from an aqueous slurry containing 5% of microspheres by volume, as well as removing all the non-interstitial liquid. It will be appreciated that if a greater degree of separation is required, the microspheres and liquid emerging from the duct 98 may be supplied to the inlet tube 80 of an identical separator 10.

If the flow of slurry into the tube 80 ceases, then any microspheres within the separator 10 will continue to roll or slide down the upper screening deck 12 and the lower screening deck 14 and will not be trapped within the separator 10. An operator can confirm that this is so by inspection through the glass plate 100.

Referring again to FIG. 2, the width 'd' of the spaces between the plates 30 must be less than the diameter of the microspheres. The thickness 'D' of the plates 30 must be sufficient for the plates 30 to remain rigid. The vertical height 'H' of the plates 30 should be such that surface tension forces cannot support liquid between the plates 30, and hence:

$$H > 2\gamma/d\rho g$$

where $\gamma$ is the surface tension of the liquid, $\rho$ is the density of the liquid, and g is the gravitational field strength.

When separating liquid from very small spheres with a separator 10 as described above the plates 30 will have to be very close together and consequently would have to be inconveniently high. This problem can be avoided by the use of a separator 10 with the upper and the lower screening decks 12 and 14 modified as shown in FIG. 3, which reference is now made.

FIG. 3 shows a modified upper screening deck 112 comprising a large number of stainless steel plates 30 spaced apart by washers 34 and held together by tie rods 36 between side plates 46 (not shown) as in FIG. 2. Midway between upper edges 32 of adjacent plates 30 are taut stainless steel wires 114 welded at each end to a separator plate 50 or 52 (see FIG. 1), the upper surfaces of the wires 114 being coplanar with the upper edges 32 of the plates 30. The minimum size sphere is now given by the width of the space between one of the plates 30 and an adjacent wire 114. It will be understood that the lower screening deck 14 of FIG. 1 may be modified in the same manner, taut wires 114 being welded at each end to the separator plates 64 and 66 so as to lie midway between the upper edges of the plates 60.

It will be appreciated from FIG. 1 that the vertical height "h" through which the microspheres fall from the upper screening deck 12 to the lower screening deck 14 should be sufficient to ensure that any clumps of microspheres are broken up on impact, and to ensure that clumps of microspheres do not pile up on top of each other and so provide an interstitial path for liquid flow from the upper screening deck 12 to the lower screening deck 14, but should not be so high that the microspheres are significantly deformed on impact. For separating liquid from gel microspheres of diameter about 2 mm, the preferred height "h" is about 150 mm, though heights "h" greater than about 30 mm and less than about 400 mm are also suitable.

The angle of slope of each screening deck 12 and 14 has been described as about 40° to the horizontal, but it will be understood that angles between about 30° and about 60° are suitable, as the slope must be sufficient to ensure the spheres slide or roll down the screening decks 12 and 14 even if no liquid enters the separator 10, and must be gentle enough to allow time for liquid to drain away from the spheres. It will be understood that the upper screening deck 12 might have a different slope to that of the lower screening deck 14. It will also be appreciated that a separator might include more than two screening decks if a greater degree of separation is required, and also that whereas the upper screening deck 12 and the lower screening deck 14 both slope down in the same direction and in the same plane, from left to right as shown, alternate screening decks might slope down in opposite directions in the same plane, or might slope down in planes at an angle to each other, as long as the screening decks are arranged so that spheres tumble over the end of an upper screening deck and then pass along a lower screening deck. In some cases a baffle (not shown) may have to be provided to ensure that liquid draining through one screening deck does not fall onto a lower screening deck.

We claim:

1. A separator for separating liquid from particles of substantially spherical shape, and comprising a plurality of stationary sloping screening decks in stepped relationship, each screening deck comprising a plurality of members in spaced relationship to each other and extending in the direction of slope of the respective deck, the width d of the space between adjacent members being less than the diameter of the particles, at least some of the members being laminae, and the vertical height H of the laminae being greater than $2\gamma/d\rho g$ where $\gamma$, $\rho$ and g are as hereinbefore defined, so that in operation of the separator the particles move down the slope of each screening deck and tumble over the step from one screening deck to the next, while the liquid flows downwardly in the spaces between the members.

2. A separator as claimed in claim 1 wherein the laminae are thinner than the diameter of the particles.

3. A separator as claimed in claim 1 wherein the screening decks are inclined at an angle of between 30° and 60° to the horizontal.

4. A separator as claimed in claim 1 wherein the width d of the space between adjacent members is such as not to pass substantially spherical particles of diameter about 2 mm or less.

5. A separator as claimed in claim 1 wherein the height of the step from one screening deck to the next is at least 30 mm.

6. A separator as claimed in claim 5 wherein the step is of height about 150 mm.

7. A separator as claimed in claim 1 wherein the width of the space between adjacent members is about 1 mm.

8. A separator as claimed in claim 7 wherein the laminae are each of about ½ mm width.

9. A separator as claimed in claim 7 wherein substantially all of the members are laminae.

10. A method for separating liquid from particles of substantially spherical shape comprising, draining the liquid from the particles by causing the particles to pass along a stationary slotted sloping screening deck, the slots extending in the direction of the slope and being defined between members at least some of which are laminae, the vertical height H of the laminae being greater than $2\gamma/d\rho g$ where d is the width of the slots, and $\gamma$, $\rho$ and g are as hereinbefore defined, breaking up any clumps of the particles by tumbling the particles over a step, and again draining the liquid from the particles by causing the particles to pass along another stationary slotted sloping screening deck.

11. A method as claimed in claim 10 wherein the particles are of diameter about 2 mm or less.

12. A method as claimed in claim 10 wherein the width d of the space between adjacent members is about 1 mm.

13. A method as claimed in claim 12 wherein the laminae are each of about ½ mm width.

14. A method as claimed in claim 12 wherein substantially all of the members are laminae.

* * * * *